United States Patent
Haikin et al.

(10) Patent No.: US 11,984,116 B2
(45) Date of Patent: May 14, 2024

(54) METHOD AND SYSTEM FOR UNSUPERVISED DISCOVERY OF UNIGRAMS IN SPEECH RECOGNITION SYSTEMS

(71) Applicant: GENESYS CLOUD SERVICES, INC., Daly City, CA (US)

(72) Inventors: Lev Haikin, Tel-Aviv (IL); Arnon Mazza, Tel-Aviv (IL); Eyal Orbach, Tel-Aviv (IL); Avraham Faizakof, Tel-Aviv (IL)

( * ) Notice: Subject to any disclaimer, the term of this patent is extended or adjusted under 35 U.S.C. 154(b) by 388 days.

(21) Appl. No.: 17/520,816

(22) Filed: Nov. 8, 2021

(65) Prior Publication Data

US 2023/0144379 A1 May 11, 2023

(51) Int. Cl.
| | |
|---|---|
| G10L 15/197 | (2013.01) |
| G06N 20/00 | (2019.01) |
| G10L 15/06 | (2013.01) |
| G10L 15/10 | (2006.01) |
| G10L 15/22 | (2006.01) |

(52) U.S. Cl.
CPC ............ G10L 15/197 (2013.01); G06N 20/00 (2019.01); G10L 15/063 (2013.01); G10L 15/10 (2013.01); G10L 15/22 (2013.01); G10L 2015/0635 (2013.01)

(58) Field of Classification Search
CPC ..... G10L 15/197; G10L 15/063; G10L 15/10; G10L 15/22; G10L 2015/0635; G06N 20/00
See application file for complete search history.

(56) References Cited

U.S. PATENT DOCUMENTS

| | | | | |
|---|---|---|---|---|
| 11,398,227 | B1* | 7/2022 | Berckmann | G06N 3/044 |
| 2003/0233235 | A1* | 12/2003 | Park | G06F 40/268 |
| | | | | 704/257 |
| 2019/0189115 | A1* | 6/2019 | Hori | G10L 15/22 |
| 2019/0347323 | A1* | 11/2019 | Riesa | G06F 40/232 |
| 2021/0295846 | A1* | 9/2021 | Yang | G10L 25/30 |
| 2022/0067269 | A1* | 3/2022 | de Oliveira | G06F 40/35 |
| 2023/0109734 | A1* | 4/2023 | Galle | G06N 3/09 |
| | | | | 704/9 |

OTHER PUBLICATIONS

International Search Report and Written Opinion regarding co-pending PCT application having application No. PCT/US2022/049251 dated Mar. 27, 2023.

* cited by examiner

*Primary Examiner* — Anne L Thomas-Homescu

(57) ABSTRACT

A system and method of automatically discovering unigrams in a speech data element may include receiving a language model that includes a plurality of n-grams, where each n-gram includes one or more unigrams; applying an acoustic machine-learning (ML) model on one or more speech data elements to obtain a character distribution function; applying a greedy decoder on the character distribution function, to predict an initial corpus of unigrams; filtering out one or more unigrams of the initial corpus to obtain a corpus of candidate unigrams, where the candidate unigrams are not included in the language model; analyzing the one or more first speech data elements, to extract at least one n-gram that comprises a candidate unigram; and updating the language model to include the extracted at least one n-gram.

17 Claims, 8 Drawing Sheets

METHOD AND SYSTEM FOR UNSUPERVISED DISCOVERY OF UNIGRAMS IN SPEECH RECOGNITION SYSTEMS

FIELD OF THE INVENTION

The present invention relates generally to the field of speech recognition. More specifically, the present invention relates to unsupervised discovery of unigrams in speech recognition systems.

BACKGROUND OF THE INVENTION

In the field of speech analysis and speech recognition, Large Vocabulary Continuous Speech Recognition (LVCSR) systems are used to recognize from spoken text and then apply a vocabulary dictionary or language model of potentially 50,000-100,000 words and phrases to produce a transcript of that spoken text.

Currently available speech recognition systems such as LVCSR are therefore unable, by design, to recognize words that are out-of-vocabulary. For example, an LVCSR system of a call-center for a pharmaceutical company will not be able to recognize terms describing drug names and medical conditions if these terms are absent from the LVCSR language model.

This point is further exacerbated by the fact that domain-specific terms, which may normally be excluded from global, domain-agnostic language models, may also carry high significance in their specific field or domain. Pertaining to the pharmaceutics example: drug names, as well as in-domain words such as "insulin", "antihistamine", "meningitis" "abdominal pain", "antibiotics", etc., may be very relevant in the specific field of medicine and pharmaceutics, but may nevertheless not be included in a language model of the speech analysis system, and may thus not be recognized from speech.

Currently available speech analysis systems such as LVCSR may maintain a supervised learning mechanism which allows augmenting the vocabulary "on-site" by manually adding phrases to an n-gram based language model, in an ever-continuous effort to update and validate domain-specific language models. It may be appreciated that this approach requires extensive human intervention.

SUMMARY OF THE INVENTION

A method and system for automatic, continuous, and unsupervised discovery of unigrams in a speech recognition systems is therefore required.

Embodiments of the invention may include a method of automatically discovering unigrams in a speech data element, by at least one processor.

Embodiments of the method may include receiving a language model, that may include a plurality of n-grams, where each n-gram may include one or more unigrams; applying an acoustic machine-learning (ML) model on one or more first speech data elements to obtain a character distribution function; applying a greedy decoder on the character distribution function, to predict an initial corpus of unigrams; filtering out one or more unigrams of the initial corpus to obtain a corpus of candidate unigrams that are not included in the language model; analyzing the one or more first speech data elements, to extract at least one n-gram that includes a candidate unigram; and updating the language model to include the extracted at least one n-gram.

According to some embodiments, the at least one processor may apply a beam decoder on a second speech data element (e.g., during a stage of inference), to produce at least one transcription of the second speech data element, based on the updated language model.

According to some embodiments, the character distribution function may represent a likelihood of appearance of one or more language characters in the one or more first speech data elements.

According to some embodiments, the at least one processor may retrain the acoustic ML model, based on the at least one second speech data element, using the extracted at least one n-gram as supervisory data.

According to some embodiments, the at least one processor may filter out one or more unigrams by: (a) for one or more candidate unigrams, calculating a misspell probability, representing a likelihood that a relevant unigram is a misspelled version of a unigram that is already included in the language model; and (b) filtering out candidate unigrams that correspond to a misspell probability that exceeds a predefined threshold.

According to some embodiments, the at least one processor may calculate a misspell probability by: calculating a Levenshtein distance value between the candidate unigram and at least one second unigram, already included in the language model; calculating a frequency score, representing a ratio of appearance between the candidate unigram and the at least one second unigram in the one or more first speech data elements; and calculating the misspell probability based on the Levenshtein distance value and the frequency score.

According to some embodiments, the greedy decoder may be adapted to emit, for each unigram of the initial corpus, a respective confidence level. In such embodiments, the at least one processor may be configured to calculate a misspell probability further by: calculating a confidence score, representing an average of the confidence level for one or more appearances of the candidate unigram in the one or more first speech data elements; and calculating the misspell probability further based on the confidence score.

According to some embodiments, the language model may further include a definition of one or more language syntactic rules. In such embodiments, the at least one processor may be configured to calculate the Levenshtein distance by: calculating a number of single-character edits between the candidate unigram and the second unigram; and calculating the Levenshtein distance value based on the one or more language syntactic rules and the number of single-character edits.

According to some embodiments, the at least one processor may calculate, for one or more candidate unigrams, a missing space probability. The missing space probability may represent a likelihood that the candidate unigram may be a concatenation of two unigrams that are already included in the language model. Additionally, the at least one processor may filter out candidate unigrams that correspond to a missing space probability that exceeds a predefined threshold.

According to some embodiments, the at least one processor may: calculate, for at least one first candidate unigram, a first unigram embedding vector, based on the corpus of candidate unigrams; calculate, for at least one second candidate unigram, a second unigram embedding vector, based on the corpus of candidate unigrams; calculate a similarity score based on the first unigram embedding vector and the second unigram embedding vector, and compute the misspell probability further based on the similarity score.

According to some embodiments, the at least one processor may receive a document corpus, that includes a plurality of documents, where each document may be associated with a specific subject domain, and where each document includes a plurality of document unigrams.

The at least one processor may calculate, for one or more candidate unigrams, an in-domain score based on the plurality of document unigrams, wherein said in-domain score represents a likelihood that the candidate unigram may be pertinent to at least one specific domain.

Additionally, for one or more candidate unigrams, the at least one processor may: compile a context list that may include a subset of document unigrams. The subset of document unigrams may (a) have an in-domain score that exceeds a predefined threshold and (b) appear in the one or more first speech data elements. For each document, the at least one processor may obtain an intersection group that may include unigrams that appear in the document and in the context list. For each document, the at least one processor may calculate a correctness score representing relevance of the candidate unigram to the document, based on the in-domain scores of document unigrams in the intersection group. The at least one processor may subsequently filter-out or omit candidate unigrams that correspond to a maximal correctness score that is below a predefined threshold.

According to some embodiments, the greedy decoder may be adapted to emit, for each unigram of the initial corpus, a respective confidence level. In such embodiments, the at least one processor may analyze a speech data element of the one or more first speech data elements by: for one or more candidate unigrams, locating in the speech data element, an n-gram of adjacent unigrams, may include the candidate unigram; if (a) the unigrams of said n-gram correspond to a confidence level beyond a predefined value, and (b) said n-gram includes more than a predefined threshold number of unigrams then the language model may be updated to include the extracted at least one n-gram. If otherwise, then the candidate unigram may be filtered out of the corpus of candidate unigrams.

Embodiments of the invention may include system for automatically discovering unigrams in a speech data element. Embodiments of the system may include: a non-transitory memory device, wherein modules of instruction code may be stored, and at least one processor associated with the memory device, and configured to execute the modules of instruction code.

Upon execution of the modules of instruction code, the at least one processor may be configured to: receive a language model, may include a plurality of n-grams, each may include one or more unigrams; apply an acoustic ML model on one or more first speech data elements to obtain a character distribution function; apply a greedy decoder on the character distribution function, to predict an initial corpus of unigrams; filter out one or more unigrams of the initial corpus to obtain a corpus of candidate unigrams, said candidate unigrams not included in the language model; analyze the one or more first speech data elements, to extract at least one n-gram that may include a candidate unigram; and update the language model to include the extracted at least one n-gram.

Additionally, embodiments of the system may include a beam decoder, configured to receive at least one second speech data element, and produce a transcription of the at least one second speech data element, based on the updated language model.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
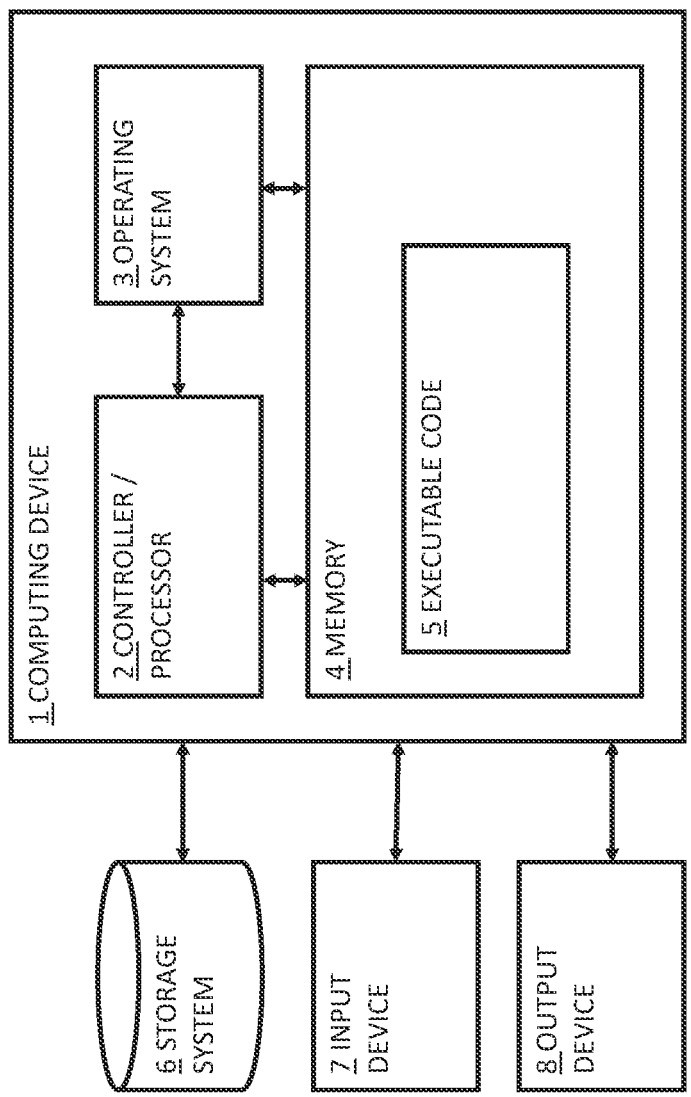
FIG. 1 is a block diagram, depicting a computing device which may be included in a system for speech recognition, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

The following Table 1 includes a glossary of terms used herein.

TABLE 1

| | |
|---|---|
| Speech, Speech data element | The terms "speech" and "speech data element" may be used herein interchangeably to indicate a data element such as an audio file, or an audiovisual file, or streaming data, that may include a recording, or a representation of human speech in a natural language (e.g., English, French, etc.). |
| Speech recognition, Speech transcription | The terms "speech recognition" and "speech transcription" may be used herein interchangeably to indicate an automated process for receiving an audio or audiovisual data element containing human speech, and extracting therefrom a text data element representing a transcription of the speech. |
| Unigram | The term "unigram" may be used herein to refer to an item, such as a word, that may be included in, or extracted from a given sample of text or speech. |
| Ngram (n-gram) | The term "n-gram" may be used herein to refer to a contiguous sequence of a number ('n', e.g., 2, 3, etc.) of unigrams (e.g., words) that may be included in, or extracted from a given sample of text or speech. |
| Acoustic model, Acoustic neural network, Unigram distribution function | The terms "acoustic model" and "acoustic neural network" may be used herein interchangeably to indicate an audio information processing paradigm. As known in the art, an acoustic model may be adapted to receive a speech data element, and extract therefrom a character distribution function. The character distribution function may represent a probability of appearance of each character (e.g., letter) in the underlying speech data element. |
| Greedy decoder | The term "greedy decoder" may be used herein to refer to an automated search process, that may extract at least one n-gram from a given speech data element. As known in the art, a greedy decoding process may receive a character distribution function (e.g., from an acoustic model) corresponding to an underlying speech data element. The character distribution function may be sequence of character-distributions (e.g., one character-distribution per one or more audio frames of typically 25 milliseconds). Each character-distribution may be a concrete vector of numbers (e.g., a realization of a distribution function). The greedy decoding process may then extract or produce an n-gram that includes unigrams corresponding to the maximal character distribution function values. |
| Beam decoder | The term "beam decoder" may be used herein to refer to another automated search process, that may extract at least one n-gram from a given speech data element. As known in the art, a beam decoder may receive a character distribution function (e.g., from an acoustic model) corresponding to an underlying speech data element. The beam decoding process may then apply an n-gram based language model to extract or produce at least one n-gram that (a) corresponds to high character distribution function values, and (b) is included in the n-gram based language model. |
| Vocabulary, Language model | The terms "vocabulary" and "language model" may be used herein interchangeably to refer to a statistical model, commonly used in natural language processing (NLP) applications, for determining the probability of a given sequence of words to occur in a sentence of a natural language such as English or Spanish. |
| Neural Network | The term "neural network" (NN) or "artificial neural network" (ANN), e.g., a neural network implementing a machine learning (ML) or artificial intelligence (AI) function, may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may |

TABLE 1-continued receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g., CPUs or graphics processing units (GPUs), or a dedicated hardware device may perform the relevant calculations.

Reference is now made to FIG. 1, which is a block diagram depicting a computing device, which may be included in a system for speech recognition, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by processor or controller 2 possibly under control of operating system 3. For example, executable code 5 may be an application that may perform speech recognition as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to one or more speech data elements may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components, or systems, e.g., a detachable keyboard or keypad, a mouse, and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

In recent years, a new approach to speech recognition, commonly referred to as "End-to-end recognition" has opened another option for detecting new words. Unlike previous speech recognition methods which rely on a word-level graph to perform the recognition, where every word is built from a sequence of phonemes, end-to-end recognition has completely switched to character level. This means that rather than an output which is a sequence (or graph, "lattice") of words or phonemes, end-to-end speech recognition outputs a character distribution function.

Figure 2:
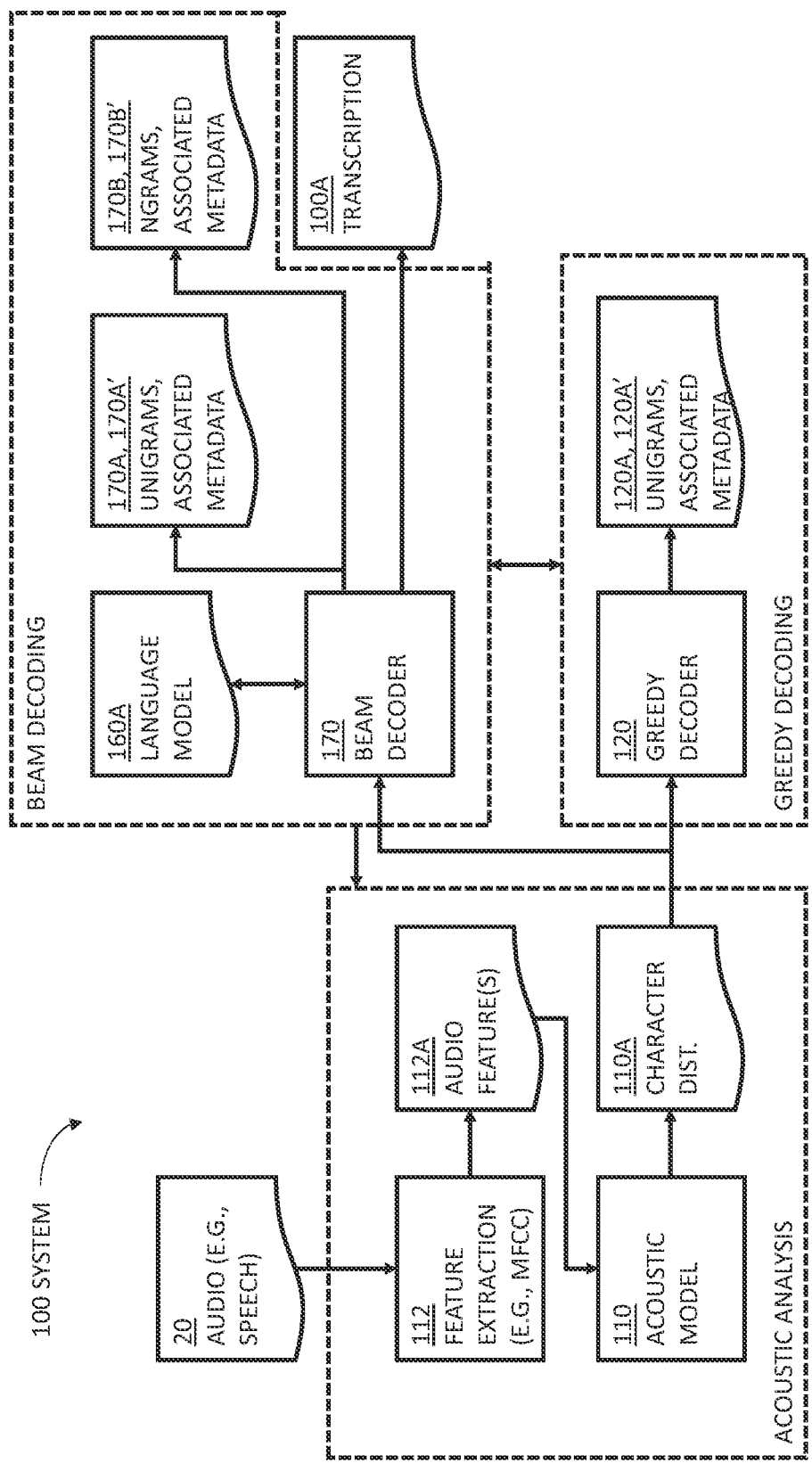
FIG. 2 is a block diagram, depicting an overview of a system for speech recognition, according to some embodiments of the invention.

Reference is now made to FIG. 2 which is a block diagram, depicting an overview of a system 100 for speech recognition, according to some embodiments of the invention. As elaborated herein, system 100 may be configured to automatically discover unigrams (e.g., words) in one or more speech data element, to enhance a given language model 160A, and then utilize the enhanced language model 160A with a beam decoder, to perform speech recognition on one or more new speech data element samples.

As depicted in FIG. 2, system 100 may implement end-to-end speech-recognition, while leveraging a synergy between three separate functions (marked by dashed lines): acoustic analysis, greedy decoding, and beam decoding, as elaborated herein.

According to some embodiments of the invention, system 100 may be implemented as a software module, a hardware module, or any combination thereof. For example, system 100 may be or may include a computing device such as element 1 of FIG. 1, and may be adapted to execute one or more modules of executable code (e.g., element 5 of FIG. 1) to perform speech recognition, as further described herein.

As shown in FIG. 2, arrows may represent flow of one or more data elements to and/or from system 100 and/or among modules or elements of system 100. Some arrows have been omitted in FIG. 2 for the purpose of clarity.

As shown in FIG. 2, system 100 may receive (e.g., from input device 7 of FIG. 1) an initial version of a language model 160A. According to some embodiments, language model 160A may include a plurality of n-grams, where each n-gram may include one or more unigrams. For example, as known in the art of Natural Language Processing (NLP), n-gram based language model 160A may include a plurality of n-grams, each representing a set or combination of unigrams (e.g., words). Each n-gram may be associated with an n-gram probability, representing probability or frequency of appearance of the respective combination of unigrams in a corpus of documents. For example, an n-gram probability of the n-gram "I love you" may be higher than an n-gram probability of the ngram "I love pancakes", representing higher likelihood that the unigram "you" will appear in a speech data element 20 following the n-gram "I love".

According to some embodiments, system 100 may receive (e.g., via input device 7 of FIG. 1) one or more audio or speech data elements 20. The one or more audio or speech data elements 20 may be for example an audio file or a stream of data that may include, or may represent human speech in a natural language (e.g., English, French, etc.). As elaborated herein, system 100 may be configured to perform unsupervised discovery of unigrams in the one or more speech data elements 20, and subsequently produce a transcription data element 100A, representing a speech transcription of the received one or more audio or speech data elements 20.

According to some embodiments, system 100 may include a feature extraction module 112, adapted to extract one or more audio features 112A from speech 20.

For example, feature extraction module 112 may be configured to extract from speech 20 one or more audio features 112A, such as Mel-frequency cepstral coefficients (MFCCs). As known in the art, MFCC coefficients may be derived from a cepstrum of an audio data element such as a stream of an audio signal. The cepstrum may, in turn, be computed as an inverse Fourier transform (IFT) of a logarithm of a frequency spectrum of the audio signal.

As shown in FIG. 2, feature extraction module 112 may feed audio features 112A (e.g., MFCCs) into a machine learning (ML) based acoustic model 110. System 100 may apply acoustic model 110 on the one or more speech data elements 20 and/or on the corresponding audio features 112A, to produce, or predict (as commonly referred to in the art) a character distribution function 110A. Character distribution function 110A may represent a probability distribution of language characters (e.g. [a-z]) over a given alphabet, based on the input audio features 112A. In other words, character distribution function 110A may represent a likelihood of appearance of one or more language characters in the one or more speech data elements 20.

As known in the art, acoustic model 110 may predict character distribution function 110A in relation to specific timeframes (e.g., 25 milliseconds (ms)) of the input speech 20 data element. In other words, for each timeframe of input speech 20, ML-based acoustic model 110 may produce a character distribution function 110A of language characters (and/or non-speech or "blank space" portions in speech 20), representing a probability that specific letters or characters have been uttered or pronounced during that timeframe.

According to some embodiments, acoustic model 110 may include an ML-based model, such as a convolutional neural-network (CNN) model, a deep convolutional neural network (DNN) model, a recurrent neural network (RNN) model, an attention-based neural network model, or any other appropriate ML model for predicting character distribution function 110A, as known in the art.

According to some embodiments, system 100 may include a greedy decoder module 120, adapted to receive a character distribution function 110A from acoustic model 110, pertaining to a specific timeframe of an underlying speech data element 20.

As known in the art greedy decoder 120 may be configured to initially remove repetitions of characters and/or appearance of non-speech or "blank space" portions within the given timeframe. Greedy decoder 120 may subsequently determine the most likely combination or sequence of remaining characters, within the given timeframe and/or among a plurality of consecutive timeframes, to produce one or more unigrams 120A or words, based on character distribution function 110A. For example, greedy decoder 120 may produce one or more unigrams 120A by selecting a sequence of characters that correspond to the maximal appearance probability, as reflected by the character distribution function 110A.

Additionally, greedy decoder 120 may associate or attribute unigram metadata 120A' to each produced unigram 120A. For example, unigram metadata 120A' may include a timeframe corresponding to each produced unigram or word 120A, defining a start-time and an end-time for the sequence of characters that comprise the relevant unigram 120A.

In another example, greedy decoder 120 may compute, for one or more (e.g., each) produced unigram, a unigram metadata 120A' element that represents a confidence level or confidence score (e.g., a numerical value in the range of [0,1]) for the appearance of the unigram 120A in the underlying speech data element 20. The confidence score may, for example be calculated as a function of probabilities of the characters included in the unigram (e.g., as reflected in character distribution function 110A), and may be normalized, for example by the length (e.g., number of characters) of the relevant unigram. Greedy decoder 120 may then assign or attribute the confidence score as metadata 120A' for the relevant unigram 120A.

According to some embodiments, system 100 may continuously apply greedy decoder 120 on one or more instances of character distribution function 110A, to produce, or predict an initial corpus of unigrams 120A (and corresponding metadata 120A'). The term "continuously" may be used in this context to indicate that greedy decoder 120 may be applied on a plurality of instances of character distribution function 110A, originating from a respective plurality of timeframes in a single speech data element 20. Additionally, or alternatively, greedy decoder 120 may be applied to a plurality of instances of character distribution function 110A, originating from a plurality of speech data element 20.

It may be appreciated by a person skilled in the art that a greedy decoder such as greedy decoder 120 may be able to recognize any character sequence, but may be prone to output misspelled words (e.g., "termometer" instead of "thermometer"). In other words, the initial corpus of unigrams 120A may include misspelled words. Conversely, a beam decoder, such as beam decoder 170 may not produce or emit a transcription that includes misspelled words, but may be limited by a large, albeit finite vocabulary or language model 160A.

Figure 3:
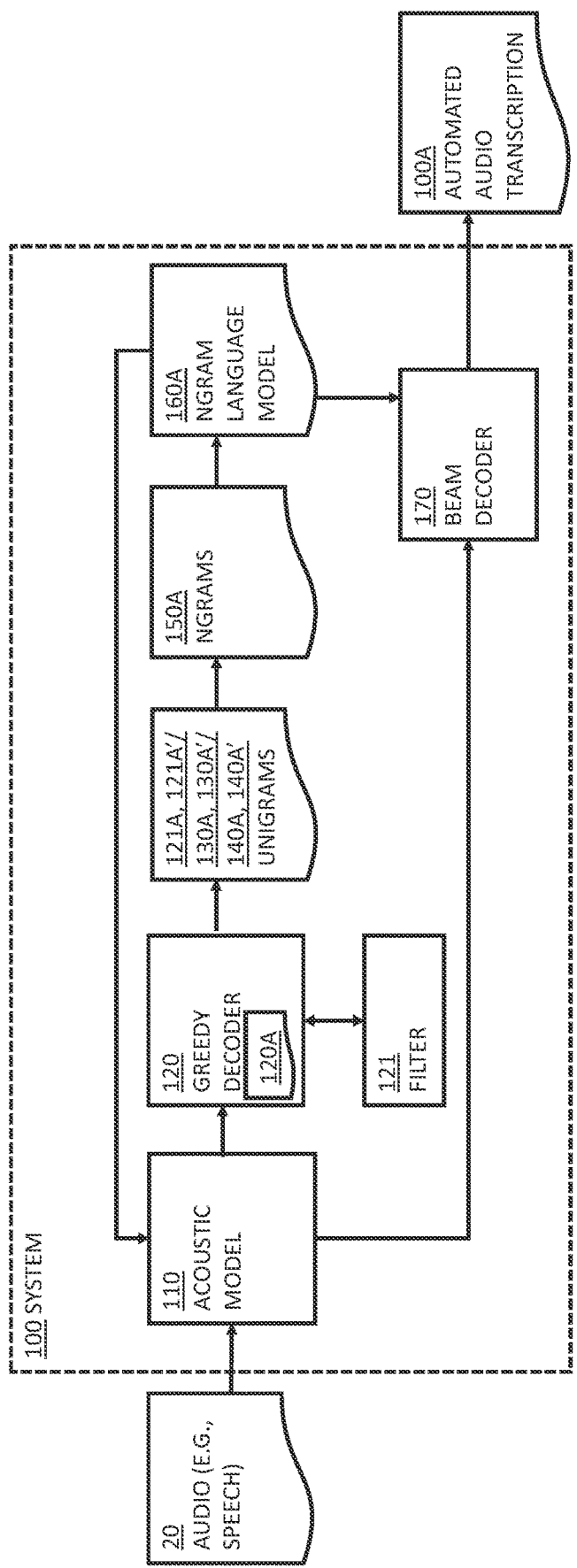
FIG. 3 is a block diagram, depicting flow of data in a system for speech recognition, according to some embodiments of the invention.

Reference is now made to FIG. 3, which is a block diagram depicting flow of data in system 100 for speech recognition, according to some embodiments of the invention. It may be appreciated that system 100 of FIG. 3 may be the same system 100 as depicted in FIG. 2, where some of the modules and elements have been omitted for the purpose of clarity.

According to some embodiments, greedy decoder 120 may collaborate with a filter module 121, configured to apply a filter on the initial corpus of unigrams 120A, to filter-out or exclude unigrams (e.g., words) that are already included in language model 160A. This filtration may produce a corpus of candidate unigrams, denoted herein as unigrams 121A, and corresponding metadata 121A'.

As elaborated herein (e.g., in relation to FIG. 4), system 100 may apply a set of filters on candidate unigrams 121A to produce one or more filtered unigrams, denoted herein as filtered unigrams 130A, 140A, and corresponding metadata (130A', 140A'), describing filtered unigrams 130A, 140A. As elaborated herein (e.g., in relation to FIG. 4), system 100 may analyze the audio speech data element 20 and/or filtered unigrams 130A/140A to produce or extract at least one n-gram 150A, that may include one or more filtered unigrams 130A/140A. System 100 may then update or enhance language model 160A to include the at least one n-gram 150A.

As shown in FIG. 3, system 100 may include, or may collaborate with a beam decoder 170. System 100 may allow beam decoder 170 to utilize enhanced language model 160A, to produce error-free transcription 100A of an audio speech data element 20, based on the enhanced language model 160A. In other words, system 100 may apply beam decoder 170 on at least one new speech data element 20, to produce at least one transcription 100A of the new speech data element, based on the updated language model 160A.

Additionally, and as also elaborated herein, system 100 may utilize the extracted n-grams 150A, with corresponding audio segments of speech data elements 20 (e.g., marked by start time and end time of the n-gram in speech data elements 20) as feedback for acoustic model 110, to fine-tune or retrain acoustic model 110. System 100 may thus automatically produce more accurate predictions of character distribution function 110A, based on automatic extraction of n-grams 150A.

Embodiments of the invention may include a practical application of performing a task of speech recognition and transcription, and may include several improvements over currently available methods and systems for speech recognition.

For example, by combining the benefits of greedy decoders and beam decoders in synergy, embodiments may automatically (e.g., without need for manual supervision) identify new unigrams or words that are absent in language model 160A, enhance the language model or vocabulary 160A to include these new unigrams or words, and produce error-free transcription of speech data elements that include the newly identified unigrams.

Additionally, embodiments of the invention may utilize this benefit of automated unigram identification to continuously (e.g., repeatedly through time) retrain or refine an underlying acoustic model such as acoustic model 110. It may be appreciated that such as acoustic model may be a cornerstone of any speech recognition paradigm. Therefore, refinement or fine-tuning of the acoustic model may, for example result in producing text transcriptions 100A that may be agnostic to locale or accent of a speaker.

Figure 4:
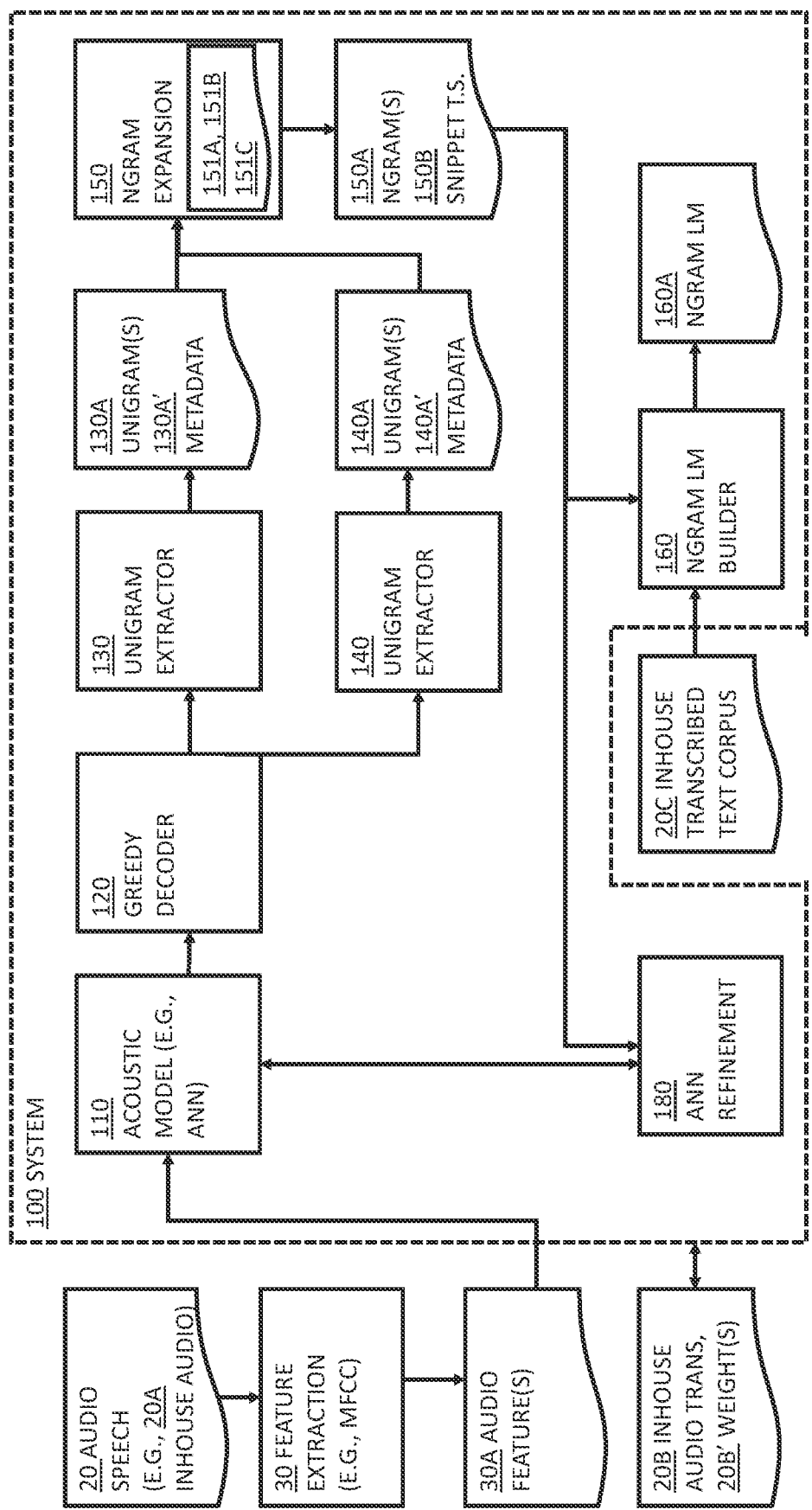
FIG. 4 is a block diagram, depicting another view of a system for speech recognition, according to some embodiments of the invention.

FIG. 4 is a block diagram, depicting another view of system 100 for speech recognition, according to some embodiments of the invention. It may be appreciated that system 100 of FIG. 4 may be the same system 100 as depicted in FIG. 2 and/or FIG. 3.

As shown in FIG. 4, system 100 may include two complementary unigram extraction modules, denoted as unigram extraction modules 130 and 140. Unigram extraction modules 130/140 may receive from greedy decoder 120 a corpus of candidate unigrams 121A, that are devoid of unigrams already included in language model or vocabulary 160A. At least one (e.g., each) unigram extraction module 130/140 may be configured to classify the received candidate unigrams 121A as either a misspelled word, or a likely correct new word in the appropriate context of speech data element 20.

According to some embodiments, a first unigram extraction module (e.g., 140) may utilize an external text-corpus such as Wikipedia abstracts to filter-out likely misspelled words, whereas a second unigram extraction module (e.g., 130) may utilize a set of misspelling filters, without requiring such an external text corpus. It may be appreciated that system 100 may use either one of these functionalities separately, depending for example on the availability of external text-corpuses. Additionally, or alternatively, system 100 may combine the functionality of unigram extraction modules 130 and 140 in synergy, to produce likely correctly spelled, new unigrams (e.g., words) for enhancing n-gram based language model 160A.

Figure 5:
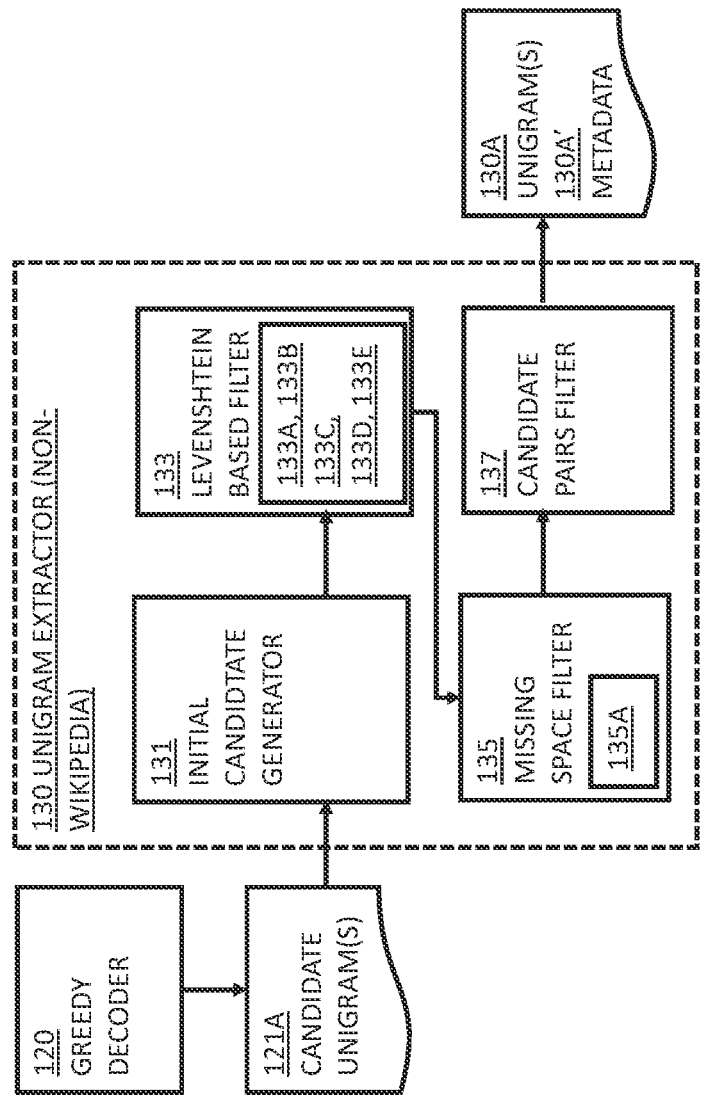
FIG. 5 is a block diagram, depicting an example of a unigram extraction module, which may be included in a system for speech recognition, according to some embodiments of the invention.

Reference is also made to FIG. 5 which is a block diagram, depicting an example of a unigram extraction module 130, which may be included in a system 100 for speech recognition, according to some embodiments of the invention. As shown in the example of FIG. 5, unigram extraction module 130 may include one or more (e.g., a set, or cascade) of several (e.g., four) different filters, denoted herein as initial candidate generator 131, Levenshtein distance based filter 133, missing space filter 135, and candidate-pairs filter 137. It may be appreciated that the order of filtration (e.g., the order of the filter set) may change between embodiments of the present invention. Other filter types and combinations are also possible. As elaborated herein, the one or more filters (e.g., 131, 133, 135 and/or 137) may filter a group or list of candidate unigrams 121A, to produce a list or group of filtered unigrams 130A, and corresponding metadata 130A'.

According to some embodiments, initial candidate generator 131 may be configured to filter-out candidate unigrams 121A that (a) are already included in language model or vocabulary 160A, or (b) have a confidence score metadata 121A' that is below a predefined confidence threshold (e.g., 0.95).

Additionally, or alternatively, initial candidate generator 131 may be configured to filter-out unigrams 121A that are below a predefined minimum count (e.g., 5). It may be appreciated that at this stage, system 100 may typically include several hundreds or thousands of unique candidate unigrams. Some of these unique candidate unigrams may be correctly spelled unigrams (e.g., words), while others may be incorrectly spelled.

As elaborated herein, unigram extraction module 130 (and/or 140) may be configured to calculate, for one or more (e.g., each) candidate unigram 121A, a misspell probability, representing a likelihood that a relevant candidate unigram 121A is a misspelled version of a unigram that is already included in language model 160A. Unigram extraction module 130 (and/or 140) may then filter-out candidate unigrams 121A that correspond to a misspell probability that exceeds a predefined threshold. In other words, unigram extraction module 130 (and/or 140) may continuously (e.g., repeatedly over time) filter-out candidate unigrams 121A in a way that may remove more of the incorrect or misspelled words in relation to the correctly spelled words.

TABLE 2

| | Type | Misspelled version | Correct version | Correction rule |
|---|---|---|---|---|
| 1. | Characters deletion | Manufactur | Manufacture | Levenshtein-Distance |
| 2. | Characters deletion | Forard | Forward | Levenshtein-Distance |
| 3. | Characters insertion | Aanother | Another | Levenshtein-Distance |
| 4. | Characters insertion | Recommened | Recommend | Levenshtein-Distance |
| 5. | Characters substitution | Ancology | Oncology | Levenshtein-Distance |
| 6. | Characters substitution | Meedle | Needle | Levenshtein-Distance |
| 7. | Characters substitution | Partridge | Cartridge | Levenshtein-Distance |
| 8. | Missing space | Thankyou | Thank you | Likely-missing-space rule |
| 9. | Missing space | Welcomebye | Welcome bye | Likely-missing-space rule |
| 10. | Split word | Rectangle | Rectangle | Bi-gram fusion rule |

Table 2 below elaborates examples for various types of misspelled unigrams or words 121A, which may be produced by a greedy decoder, and may be addressed or amended by system 100 for speech recognition, according to some embodiments of the invention. The examples provided in table 2 represent experimentally encountered examples of misspelled, frequently occurring, and high-confidence unigrams, produced by greedy decoder 120.

As known in the art, the Levenshtein distance is a metric that may be used for measuring difference between two sequences. For example, a Levenshtein distance between two words is the minimum number of single-character edits (e.g., insertions, deletions, or substitutions) required to change one word into the other.

According to some embodiments, Levenshtein based filter 133 may be configured to handle (e.g., filter out) misspelled candidate unigrams 121A, that manifest a change (e.g., substitution, insertion and/or deletion) in at least one character of a correctly spelled word.

Pertaining to the example presented in Table 2, examples 1-7 represent misspelled unigrams 121A (e.g., "Forard"), having spelling errors that occurred due to substitution, insertion and/or deletion of characters (e.g., in relation to "Forward"). In other words, Levenshtein based filter 133 may be configured to filter-out at least one candidate unigram 121A that is close enough (e.g., in terms of the Levenshtein distance) to in-vocabulary words.

It may be appreciated that Levenshtein distance filtering as known in the art may filter-out unigrams 121A solely based on the Levenshtein distance metric between unigrams may prove to be too aggressive, in a sense that it may unnecessarily exclude legitimate (e.g., correctly spelled) words. For example, in a case that a plurality of correctly spelled, in-vocabulary variants exist to a word, a currently available Levenshtein based filter would match a legitimate candidate unigram 121A to one variant of the word, and may thus erroneously disqualify and filter out the candidate unigram 121A.

According to some embodiments, Levenshtein based filter 133 may implement one or more additional tests in order to avoid such errors, and may thus provide an improvement over Levenshtein distance filters as known in the art.

For example, Levenshtein based filter 133 may calculate a Levenshtein distance value 133A between the candidate unigram 121A and at least one in-vocabulary unigram, already included in language model 160A. Levenshtein based filter 133 may then calculate a frequency score 133B, representing a ratio of appearance between the candidate unigram 121A and the at least one in-vocabulary unigram in the one or more speech data elements 20. Levenshtein based filter 133 may subsequently calculate a misspell probability 133E, based on the Levenshtein distance value 133A and the frequency score value 133B.

For example, Levenshtein based filter 133 may compute a Levenshtein distance value between candidate unigrams 121A and unigrams already included in language model 160A. Levenshtein based filter 133 may identify one or more such pairs as similar pairs, according to the distance metric value (e.g., having a Levenshtein distance value that is beneath a predefined threshold). Levenshtein based filter 133 may preserve candidate unigrams 121A that have a higher frequency score value 133B (e.g., appear more times in speech data elements 20) in comparison to their in-vocabulary 160A similar-pair unigram.

For example, if an out-of-vocabulary (OOV) candidate unigram 121A such as "pressurizing" appears 15 times in a corpus of input speech data elements 20, and an in-vocabulary (e.g., included in language model 160A) unigram such as "pressuring" appears twice in the corpus of input speech data elements 20, then Levenshtein based filter 133 may preserve the "pressurizing" candidate unigram 121A. In another example, if an OOV candidate unigram 121A such as "insect" appears 17 times in a corpus of input speech data elements 20, and an in-vocabulary unigram such as "inject" appears 3580 times, then Levenshtein based filter 133 may filter-out "insect" from the list of candidate unigrams 121A.

As elaborated herein (e.g., in relation to FIG. 2) greedy decoder 120 may be configured to emit or calculate, for each predicted unigram of the initial corpus of unigrams 120A, a respective unigram metadata 120A' element, that represents a confidence level of the predicted unigram. According to some embodiments, Levenshtein based filter 133 may calculate misspell probability 133E, further based on the confidence level (e.g., in addition to the Levenshtein distance value 133A and the frequency score value 133B).

For example, Levenshtein based filter 133 may calculate an average confidence score 133D, representing an average of the confidence level 120A' for one or more appearances of the candidate unigram 121A in the corpus of speech data elements 20. Levenshtein based filter 133 may calculate a weighted sum of frequency score value 133B average confidence score 133D. Levenshtein based filter 133 may then preserve candidate unigrams 121A that have a higher weighted sum of frequency score value 133B average confidence score 133D in comparison to their in-vocabulary 160A similar-pair unigram.

Additionally, or alternatively, Levenshtein based filter 133 may preserve candidate unigrams 121A based on a predefined set of dedicated, language-specific rules.

For example, language model 160A may include a definition of one or more language-specific syntactic rules. For example, in the case of the English language, the one or more language-specific syntactic rules may define time-wise verb conjugation (e.g., addition of "ed" at the end of a verb to signify past tense), plural vs. singular conjugation (e.g., adding "s" to signify a plurality of nouns), and the like.

In such embodiments, Levenshtein based filter 133 may calculate a number of single-character edits or changes between a candidate unigram 121A and an in-vocabulary unigram, and calculate the Levenshtein distance value 133A based on the one or more language syntactic rules and the number of single-character edits.

Pertaining to the conjugation example above, Levenshtein based filter 133 may preserve candidate unigrams 121A based on time conjugation (e.g., past form "evaluated" vs. present form "evaluates") and/or plural vs. singular conjugation (e.g., "prescription" vs. "prescriptions"), and the like. Other such rules for preserving candidate unigrams 121A may also be implemented.

It may be appreciated that currently available Levenshtein distance filters as known in the art may not distinguish between types of character changes.

For example, an 'm' that is substituted with an 'n' may be a frequent error, due to phonetic resemblance of the two letters. In contrast, substitution of 'd' with 'o' may not occur so frequently. Therefore, substitution of 'm' with 'n' may be more likely to represent a spelling mistake than substitution of 'd' with 'o'. In another example, erroneous insertion of the vowel T in currently available systems of speech recognition may occur more frequently than insertion of the consonant T, and is therefore more likely to represent a spelling mistake.

According to some embodiments, Levenshtein based filter 133 may take the frequency of such changes (e.g., substitutions, deletions and/or insertions) into account, and may thus provide an improvement over Levenshtein distance filters as known in the art. For example, unigram extraction module 130 may quantify changes (e.g., substitutions, deletions and/or insertions) of characters by computing the change probabilities 133C based on character-level alignment of the greedy decoder transcription vs human-transcription, as elaborated herein (e.g., in relation to FIG. 6).

Figure 6:
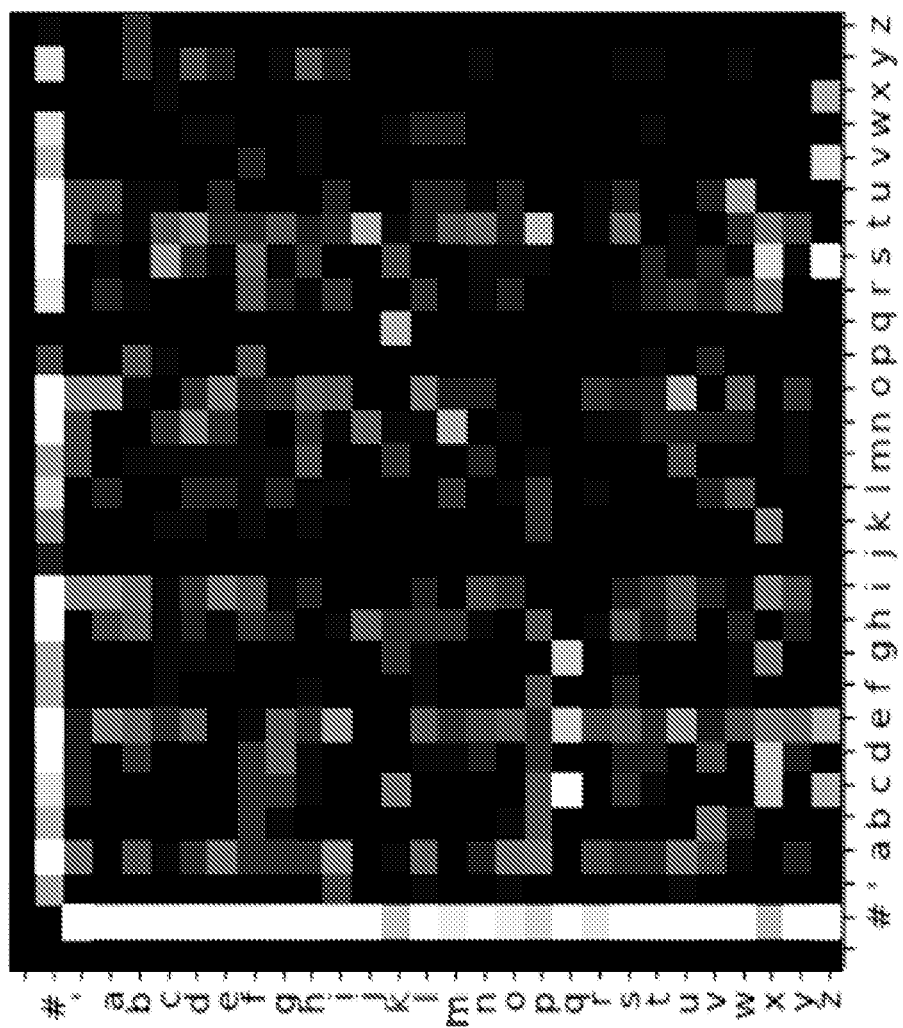
FIG. 6 is a heatmap depicting probability of substitution and deletion of letters of the English alphabet in a system for speech recognition, according to some embodiments of the invention.

Reference is now made to FIG. 6, which is an example of a heatmap depicting probability of change 133C (e.g., substitution and/or deletion) of letters of the English alphabet in a system for speech recognition, according to some embodiments of the invention.

The heatmap example of FIG. 6 has been obtained based on audio speech data elements spanning several hours, and corresponding transcription. The change probabilities 133C for each character were calculated as a ratio between the frequency or number of change occurrences and the total number of the character's appearance in the corpus of speech data elements 20.

For example, and as shown in the heatmap of FIG. 6, the letters 'z' and 's' have a high substitution probability, as do 'q' and 'c'. In another example, the apostrophe (') character has a very large deletion probability.

According to some embodiments, Levenshtein based filter 133 may calculate a Levenshtein distance value 133A between the candidate unigram 121A and at least one in-vocabulary unigram, already included in language model 160A. For each character that contributes to the Levenshtein distance value 133A, Levenshtein based filter 133 may calculate a probability of an underlying change 133C. Levenshtein based filter 133 may subsequently calculate a misspell probability 133E, based on the Levenshtein distance value 133A and further based on frequency score value 133B and/or change probability 133C. For example, misspell probability 133E may be calculated as a weighted sum of Levenshtein distance value 133A, weighted by change probability 133C. Levenshtein based filter 133 may then filter-out one or more candidate unigram 121A based on misspell probability 133E.

As shown in the examples of Table 2 (e.g., entries 8 and 9), a greedy decoder may produce misspelled candidate unigrams 121A due to omission of a space or "white space" between two consecutive unigrams (e.g., words). For example, greedy decoder 120 may omit a white space between the words "Thank" and "you", to produce a misspelled candidate unigram 121A such as "Thankyou".

According to some embodiments, unigram extraction module 130 may include a missing space filter module 135, configured to omit, or filter-out such misspelled candidate unigrams 121A.

In other words, missing space filter module 135 may calculate, for one or more candidate unigrams 121A, a missing space probability, representing a likelihood that the candidate unigram 121A is a concatenation of two unigrams that are already included in language model 160A. Missing space filter module 135 may subsequently filter out candidate unigrams 121A that correspond to a missing space probability 135A that exceeds a predefined threshold.

For example, missing space filter module 135 may compute: (a) a frequency of appearance of candidate unigrams 121A (e.g., "Thankyou") in a corpus of speech data elements 20, and (b) a frequency of appearance of concatenated bigrams (e.g., made of consecutive unigrams, such as "Thank" and "you") that produce the same unigrams as the candidate unigrams 121A after concatenation (e.g., "Thankyou"). Missing space filter module 135 may calculate a missing space probability 135A, based on (e.g., as a ratio of) these computed frequency of appearances, and may filter out candidate unigrams 121A that correspond to a missing space probability that exceeds a predefined threshold.

Additionally, or alternatively, missing space filter 135 may filter-out all "concatenated" candidate unigrams 121A (e.g., "Thankyou") that are less frequent than the corresponding combination of non-concatenated unigrams (e.g., "Thank" and "you") from the list of candidate unigrams 121A. In this example, the logic behind such filtering relies on the fact that "Thank you" would appear more frequently in the corpus of speech data elements 20 than "Thankyou", and therefore "Thankyou" is probably misspelled and should be removed.

According to some embodiments, unigram extraction module 130 may include a candidate pair filter module 137, configured to omit, or filter-out candidate unigrams 121A that don't have a pair unigram in the known vocabulary of language model 160A, but do have a more frequent, pair candidate unigram 121A in the list of candidate unigrams 121A.

According to some embodiments, candidate pair filter module 137 may compute a distance metric value (e.g., a Levenshtein distance value, as elaborated herein) between one or more (e.g., each) pairs of candidate unigrams 121A. Candidate pair filter module 137 may identify one or more such pairs as similar pairs, according to the distance metric value, e.g., having a Levenshtein distance value that is beneath a predefined threshold. For each member (e.g., candidate unigram 121A) of each similar pair, candidate pair filter module 137 may calculate, a frequency of appearance in a corpus of speech data elements 20, and subsequently remove, or filter out the less frequent member.

For example, language model 160A may initially be devoid of the unigram (e.g., word) "diabetes". Over time, a list of candidate unigrams 121A may evolve to include the correct unigram candidate 121A "diabetes", and the misspelled unigram candidate 121A "diabete". In this example, candidate pair filter module 137 may be configured to filter-out or omit the misspelled candidate unigram 121A "diabete" from the list of candidate unigrams 121A, and maintain the correct candidate unigram 121A "diabetes" for further analysis, as elaborated herein.

Figure 7:
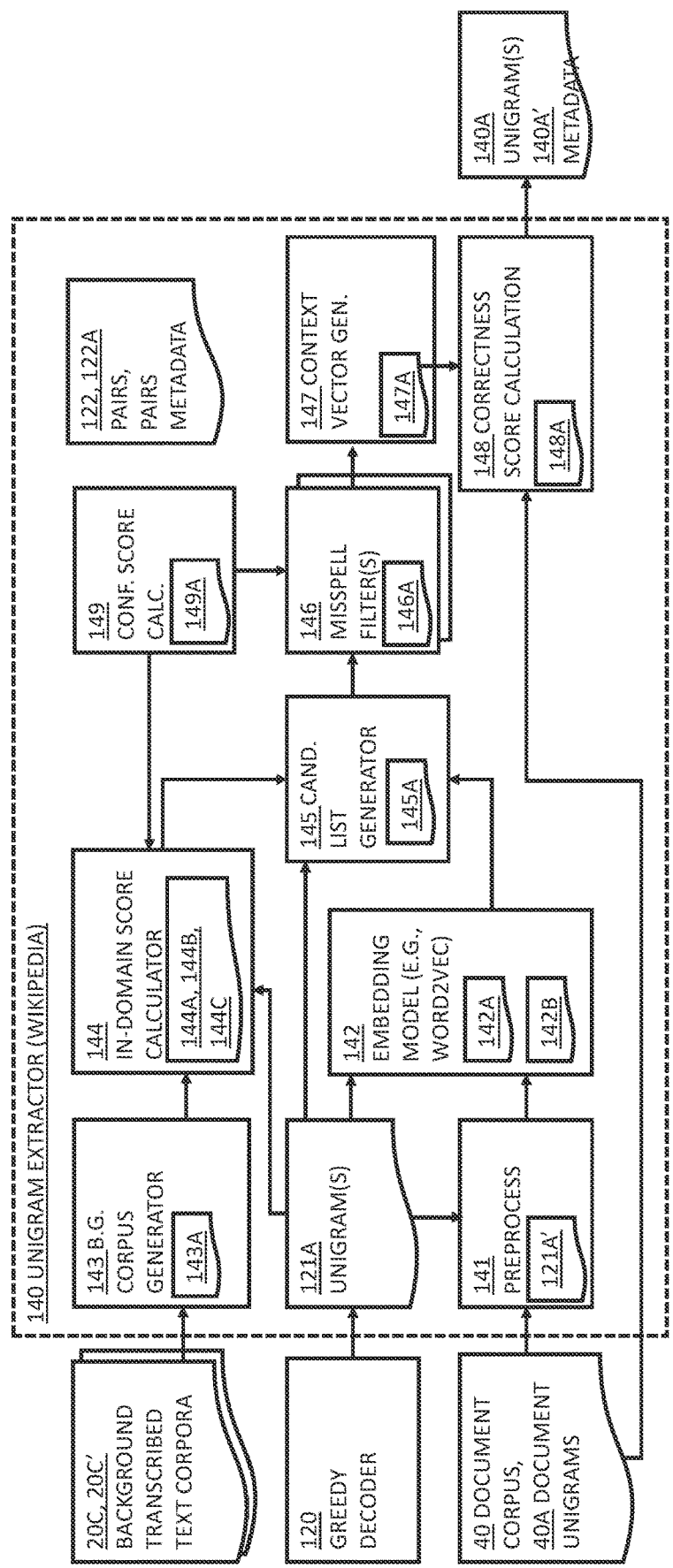
FIG. 7 is a block diagram, depicting another example of a unigram extraction module, which may be included in a system for speech recognition, according to some embodiments of the invention.

Reference is now made to FIG. 7, which is a block diagram, depicting another example of a unigram extraction module 140, which may be included in a system for speech recognition 100, according to some embodiments of the invention.

Arrows in the FIG. 7 may represent flow of data among modules of unigram extraction module 140, and/or to or from unigram extraction module 140. Some arrows have been omitted for the purpose of clarity.

As shown in FIG. 7, unigram extraction module 140 may receive one or more (e.g., a list) of candidate unigrams 121A from greedy decoder 120, and may apply a filtering process on the list of candidate unigrams 121A to obtain one or more filtered unigrams 140A and corresponding metadata.

According to some embodiments, unigram extraction module 140 may receive (e.g., from input device 7 of FIG. 1) an external document corpus that may include a plurality of text documents 40. The term "external" may be used in this context to indicate that documents 40 may not belong to the same subject domain as speech data elements 20, and may not be a result of transcription by system 100.

Each document 40 may include a plurality of document unigrams (e.g., words) 40A. For example, the document corpus may include a plurality of online documents 40 that are paper abstracts, such as Wikipedia abstracts, and document unigrams 40A may be words included in the Wikipedia abstracts. As elaborated herein, unigram extraction module 140 may utilize the corpus of text documents 40 to determine which candidate unigrams 121A produced by greedy decoder 120 are likely erroneous, and filter them out.

According to some embodiments, unigram extraction module 140 may include an embedding model 142 such as a word2vec embedding model 142, as known in the art.

Embedding model 142 may be trained, based on the corpus of unigrams produced by greedy decoder 120 (e.g., unigrams 120A, 121A), to calculate or emit embedding vectors 142A. In other words, for each sample of a candidate unigram 121A, embedding model 142 may produce an embedding vector 142A that may be or may include a vector representation of a semantic meaning of the corresponding candidate unigram 121A.

As elaborated herein, unigram extraction module 140 may utilize embedding vector similarity scores in conjunction with Levenshtein-distance, in-domain scores, and unigram-frequencies in order to reduce the noise coming from greedy decoder 120 and the corpus of documents 40.

A combination of such tools may be needed because documents 40 (e.g., Wikipedia abstracts) may contain unigrams 40A (e.g., words) that may be produced by greedy decoder 120, but may nevertheless be incorrect in the context of a transcription of speech data element 20.

For example, a speech data element 20 may include the word "going", which may be erroneously transcribed by greedy decoder 120 as "gong", which in itself is a correctly spelled word that may appear in the corpus of external documents 40. It may be clear by this example that a combination of (a) a Levenshtein-distance that is sufficiently small, and (b) an embedding vector similarity value or an in-domain score that is sufficiently large may indicate a likely misspelled unigram.

In other words, and as elaborated herein, embodiments of the invention may compute a misspell probability based on, or as a function (e.g., a weighted sum) of a Levenshtein-distance value 133A, an embedding similarity score 142B, an in-domain score and frequency of appearance.

It may be appreciated by a person skilled in the art that the extraction of unigrams as performed by unigram extraction module 140 may be complementary, and may work in synergy to the extraction of unigrams as performed by unigram extraction module 130.

For example, unigram extraction module 130 may not be dependent on a sufficiently large corpus of external documents 40. On the other hand, unigram extraction module 140 may enable to reduce the initial confidence level 120A' of candidate unigrams (in relation to that used for unigram extraction module 130), thus allowing more candidates to considered, broadening the final set of discovered words.

According to some embodiments, unigram extraction module 140 may include a preprocessing module 141, configured to process or align a syntax of document unigrams 40A and/or candidate unigrams 121A.

For example, preprocessing module 141 may prepare external documents 40 (e.g., Wikipedia abstracts) to be lower-cased, without punctuation or special characters.

In another example, preprocessing module 141 may find collocations in the greedy decoder results corpus of candidate unigrams 121A (e.g., "trouble shoot") and prepare a clone 121A' of the corpus with all found collocated unigrams "glued" with an underscore (e.g., trouble_shoot). This may be done by analyzing frequencies of co-occurrences vs single occurrences in the corpus of speech data elements 20 and then deciding, based on a predefined threshold value, whether a collocation is found.

According to some embodiments, embedding model (e.g., word2vec model) 142 may be trained to produce embedding vector 142A, based on the corpus of clone unigrams 121A'.

According to some embodiments, system 100 may differentiate between two types of unigrams, that may be referred to herein as in-domain unigrams and background unigrams. The term "in-domain" may be used in this context to indicate unigrams that are within a specific subject domain in which system 100 is configured to operate. The term "background" may be used in this context to indicate unigrams that may be beyond the specific subject domain in which system 100 is configured to operate.

For example, system 100 may be deployed to perform speech recognition, e.g., in a call center of a pharmaceutical company. In such an application, speech data elements 20 may include discussions regarding the subject domain of pharmaceutics and medicine. In this respect, in-domain unigrams may include words taken from the subject domain of pharmaceutics and medicine, such as "insulin", "heart-rate", "leukocytes", "emphysema", etc.

Pertaining to the same example, common unigrams such as "hello", "thanks", "no", "not", "what", "today" etc. are not unique or specific to any subject domain, and may therefore also be referred to as background-domain or out-of-domain words. It may be appreciated that the abundance of appearance of such words across a plurality of subject domains is what makes these words "noisy", in a sense that they may add irrelevant data to the processing of speech data elements 20. Additionally, words taken from a subject domain of banking and insurance, such as "mortgage" and "credit", may be regarded as background-domain unigrams, as they are not in-domain unigrams with respect to the subject domain of pharmaceutics and medicine.

According to some embodiments, unigram extraction module 140 may include a background corpus generator module 143 (or "background module 143" for short). Background module 143 may be configured to receive a plurality of background text corpora 20C'. For example, background text corpora 20C' may include a plurality of text data elements, obtained via transcription of one or more (e.g., a plurality of) background speech data elements 20C. The term "background" may be used in this context to indicate that speech data elements 20C and/or subsequent text corpora 20C' may not relate to the subject domain of speech data elements 20.

According to some embodiments, background module 143 may filter-out infrequent unigrams from the received text corpora 20C', to produce a corpus of background unigrams 143A. The motivation for such filtering may be filtration (e.g., omission) of misspelled unigrams in received text corpora 20C'.

According to some embodiments, unigram extraction module 140 may include an in-domain score calculator, adapted to calculate an in-domain-score 144A for each candidate unigram 121A in the greedy-decoded corpus 120A.

For example, unigram extraction module 140 may also calculate a second frequency of appearance of candidate unigram 121A in the greedy-decoder corpus of unigrams 120A. Unigram extraction module 140 may normalize (e.g., divide) second frequency of appearance by the total number of documents or speech data elements 20. This frequency of appearance may be referred to herein as a foreground normalized document frequency 144B. Unigram extraction module 140 may calculate a first frequency of appearance of candidate unigrams 121A in the in the corpus of background unigrams 143A. Unigram extraction module 140 may normalize (e.g., divide) first frequency of appearance by the total number of documents in received text corpora 20C'. This frequency of appearance may be referred to herein as a background normalized document frequency 144C. Unigram extraction module 140 may subsequently divide foreground normalized document frequency 144B by the background normalized document frequency 144C, to obtain an in-domain-score 144A for each candidate unigram 121A.

As elaborated herein, greedy decoder 120 may emit, for each decoded unigram 120A a metadata element 120A' such a confidence level metadata 120A'. According to some embodiments, unigram extraction module 140 may include a confidence score module 149, adapted to receive, for each candidate unigram 121A of the greedy-decoded corpus of unigrams 120A a confidence score 149A. Confidence score 149A may represent, for example an average confidence for each unigram. This may be calculated, for example by averaging all occurrences of a unigram 120A in the greedy-decoded output, and calculating an average of their confidence level metadata 120A'.

As known in the art of natural language processing, a word embedding vector may be a vector representation of a semantic meaning of a word, such that the words that are closer in the vector space are expected to be similar in meaning. The word embedding vector may be obtained, or produced by an embedding model (e.g., an ML-based model), based on a predefined corpus of words or unigrams.

According to some embodiments, unigram extraction module 140 may produce, from candidate unigrams 121A (or 121A') a plurality of pair combinations 122, where each pair 122 includes two candidate unigrams 121A, and wherein each pair is associated with one or more pair metric values 122A, defining relation between members of the candidate unigram pairs 122.

As elaborated herein, embedding model (e.g., word2vec model) 142 may produce, for at least one first candidate unigram 121A (or 121A') a first word embedding vector 142A, based on the corpus of candidate unigrams 121A (or 121A'), and produce, for at least one second candidate unigram 121A (or 121A') a second word embedding vector 142A based on the corpus of candidate unigrams 121A (or 121A').

According to some embodiments, embedding model 142 may compute, for one or more (e.g., each) pair 122 of candidate unigrams 121A (or 121A') a pair metric value 122A that is a similarity score 142B based on the first unigram embedding vector 142A and the second unigram embedding vector 142A. For example, similarity score 142B may be calculated as a cosine similarity between the two members of the pair of candidate unigrams 121A. In some embodiments, embedding model 142 may only produce an embedding vector 142A, and/or compute similarity score 142B based on confidence score 149A (e.g., for candidate unigrams 121A having a confidence score 149A above a predefined threshold).

Additionally, or alternatively, unigram extraction module 140 may compute, for one or more (e.g., each) pair 122 of candidate unigrams 121A (or 121A') a pair metric value 122A that is a Levenshtein distance value, as elaborated herein (e.g., in relation to FIG. 5).

Additionally, or alternatively, unigram extraction module 140 may compute, for one or more (e.g., each) pair 122 of candidate unigrams 121A (or 121A') a pair metric value 122A that is a unigram frequency of appearance for each member unigram 121A in the pair 122.

Additionally, or alternatively, unigram extraction module 140 may compute, for one or more (e.g., each) pair 122 of candidate unigrams 121A a pair metric value 122A that is an in-domain score 144C, for each unigram member 121A in the pair 122. As elaborated herein, unigram extraction module 140 may compute the in-domain score 144C based on the plurality of document unigrams 40A, such that in-domain score 144C may represent a likelihood that the candidate unigram is pertinent to at least one specific domain.

Additionally, or alternatively, unigram extraction module 140 may compute, for one or more (e.g., each) pair 122 of candidate unigrams 121A a pair metric value 122A that is a confidence score (e.g., an average confidence level) for each unigram member 121A in the pair 122.

According to some embodiments, unigram extraction module 140 may include a candidate list generator module 145, adapted to filter-out candidate unigrams 121A (or 121A') based on pair metric values 122A and/or based on respective unigram metadata 120A', so as to produce an initial list of candidate unigrams 145A. In other words, the initial list of candidate unigrams 145A may include candidate unigrams 121A as obtained by greedy decoder 120, except for candidate unigrams 121A that were filter-out, as elaborated herein.

For example, list generator module 145 may filter-out unigram candidates 121A that have a confidence score 149A that is below a predefined confidence threshold. Additionally, or alternatively, list generator module 145 may filter-out unigram candidates 121A that have an appearance count, or appearance frequency that is below a predefined threshold in speech data elements 20. Additionally, or alternatively, list generator module 145 may filter-out unigram candidates 121A that do not appear in the corpus of document unigrams 40A. Additionally, or alternatively, list generator module 145 may filter-out unigram candidates 121A that are in-vocabulary (e.g., included in the vocabulary of language model 160A).

According to some embodiments, unigram extraction module 140 may include one or more misspell filters 146, configured to filter-out unigram candidates 121A of candidate unigrams list 145A, as elaborated herein.

A first misspell filter 146 may be a common-word misspell filter 146, in a sense that it may be configured to filter-out candidate unigrams 121A of candidate unigrams list 145A as likely misspells of common words (e.g., domain-less words, having an in-domain score 144C that is below a predefined threshold).

As elaborated herein, common (e.g., not domain-specific) words such as: "is", "me", "I", "have", "why" etc. may have the same frequency in all call-center domains (be it fashion, telecommunications, pharma, etc.) As elaborated embodiments may normalize in-domain score 144C by dividing frequency of appearance of a relevant word in the in-domain corpus by frequency of appearance in a back-ground corpus. Therefore, in-domain score 144C of a common words may have a value that is near 1.0.

According to some embodiments, common-word misspell filter 146 may remove or filter out a first unigram candidate 121A that has at least one second, paired unigram (e.g., in pairs 122), where the second candidate unigram 121A: (a) has an in-domain score 144C that is within a predefined range value (e.g., suspected as being a common word), or has a confidence score (e.g., an average confidence level) that is above a predefined threshold, and (b) has a Levenshtein-distance value in relation to the first candidate unigram 121A that is beneath a predefined threshold.

In another example, common-word misspell filter 146 may remove or filter-out a first unigram candidate 121A that has at least one second, paired unigram (e.g., in pairs 122), where the second candidate unigram 121A has a higher frequency of appearance in speech data elements 20 than the first unigram candidate 121A.

Additionally, common-word misspell filter 146 may preserve one or more unigram candidate 121A candidate unigrams list 145A based on language-specific rules. For example, common-word misspell filter 146 may preserve unigram candidate 121A candidate unigrams that include a plural conjugation (e.g., concert vs. concerts).

A second misspell filter 146 may be an in-domain word misspell filter 146, in a sense that it may be configured to filter-out candidate unigrams 121A of candidate unigrams list 145A as likely misspells of in-domain words (e.g., unigrams having an in-domain score 144C that is above a predefined threshold).

For example, in-domain word misspell filter 146 may remove or filter out a first unigram candidate 121A that has at least one second, paired unigram (e.g., in pairs 122), where: (a) the Levenshtein-distance value between the candidate unigram 121A members of the pair is beneath a predefined threshold; (b) the second candidate unigram 121A has a confidence score (e.g., an average confidence level) that is above a predefined threshold; and (c) the second candidate unigram 121A has a higher frequency of appearance (e.g., by a predefined factor) in speech data elements 20 than the first unigram candidate 121A.

According to some embodiments, misspell filter 146 may compute a misspell probability 146A for one or more candidate unigrams 121A based on one or more pair metric values 122A. For example, misspell filter 146 may compute misspell probability 146A as a function (e.g., a weighted sum) of a Levenshtein-distance value 133A, an embedding similarity score 142B, an in-domain score 144C and/or a frequency of appearance 144B. Misspell filter 146 may subsequently filter out candidate unigrams 121A for which the misspell probability 146A exceeds a predefined threshold.

According to some embodiments, unigram extraction module 140 may include a context vector generator module 147, configured to produce, for each first candidate unigram 121A of the remaining candidate unigrams 121A (e.g., after filtration of candidate list generator 145 and misspells filters 146) a context vector 147A.

For example, for each specific remaining candidate unigram 121A (e.g., remaining after the previous steps of list generator 145 and misspells filters 146), context vector generator module 147 may prepare a first interim list of unigrams, taken from the union of greedy-decoder transcribed unigrams 121A, originating from speech data elements 20 that include candidate unigram 121A, and in-vocabulary words (e.g., unigrams already existing in language model 160A). Context vector generator module 147 may then remove from the first interim list all unigrams that have an in-domain score 144C that is below a predefined threshold, to produce a second interim list. Context vector generator module 147 may prepare a third interim list of all unigrams that appear in the same speech data elements 20 as the specific candidate unigram 121A. Context vector generator module 147 may subsequently intersect the second interim list with the third interim list, dropping-duplicates. The outcome of this intersection may be referred to herein as a context vector 147A, pertaining to the specific candidate unigram 121A.

It may be appreciated that context vector 147A may be a list that includes a plurality of unigrams that pertain to the same context of the specific candidate unigram 121A.

For example, an experimental application of system 100 has shown that the candidate unigram 121A "rodeo" may have a context vector 147A that may include unigrams such as: "chicago", "club", "concert", "cowboy", "game", "venue", "featuring", "garden" and the like. Each of the unigrams of context vector 147A has an in-domain score that is above the predefined threshold mentioned above.

In another experimental example from the sports subject domain, the candidate unigram 121A "dodgers" has yielded a context vector 147A that includes: "angels", "baseball", "boston", "chicago", "cubs", "game", "fame", "reds", "season", "stadium", "yankees", and the like.

In another experimental example from the pharmaceutical subject domain, the candidate unigram 121A "injection" has yielded a context vector 147A that includes: "absorbed", "administer", "blood", "dose", "drug", "needle", "puncture", "medicine", "substance", "syringes", "localized", and the like.

According to some embodiments, unigram extraction module 140 may include a correctness score calculation module 148. Correctness score calculation module 148 may be adapted to compute, for each candidate unigrams 121A of the remaining candidate unigrams 121A (e.g., after filtration of candidate list generator 145 and misspells filters 146) a correctness score 148A, based on the candidate unigram's respective context vector 147A.

For example, for each specific candidate unigram 121A, correctness score calculation module 148 may iterate over all the documents (e.g., Wikipedia abstracts) in document corpus 40 that contain containing the specific candidate unigram 121A.

In each iteration, correctness score calculation module 148 may intersect the set of unique unigrams 40A from the relevant document 40 with the context vector 147A of the candidate unigram 121A. As explained herein, context vector or context list 147A may include a subset of document unigrams 40A that (a) have an in-domain score 144C that exceeds a predefined threshold and (b) appear in the one or more speech data elements 20A (e.g., from where the specific candidate unigram 121A was obtained).

In other words, for each document 40, correctness score calculation module 148 may obtain an intersection group that may include unigrams that appear in the document and in the context list or context vector 147A. Correctness score calculation module 148 may subsequently calculate, for each document, a correctness score representing relevance of the candidate unigram to the document, based on the in-domain scores 144C of document unigrams in the intersection group.

For example, correctness score calculation module 148 may calculate a correctness score 148A by summing the in-domain scores 144C of the intersected unigrams. Additionally, correctness score calculation module 148 may normalize the calculated correctness score 148A, e.g., by multiplying the correctness score 148A by a square-root of the number of unigrams (e.g., 40A) in the intersection. Throughout the iterations, correctness score calculation module 148 may maintain the highest or maximal correctness score 148A value (e.g., maximal among all documents 40), and an identification of corresponding document 40.

According to some embodiments, correctness score calculation module 148 may proceed to find the maximal correctness score 148A and corresponding document 40 for one or more (e.g., each) of the remaining candidate unigrams 121A. Correctness score calculation module 148 may then filter-out (e.g., exclude) candidate unigrams 121A that correspond to a maximal correctness score that is below a predefined threshold.

For example, correctness score calculation module 148 may sort the candidate unigrams 121A based on their correctness scores 148A in descending order and remove the tail below a certain threshold. It may be appreciated that this sorted list of candidate unigrams, each appearing in the best context-matching document 40, may provide an indication regarding to the words' correctness.

For example, experimental results of candidate unigram 121A evaluation in the subject domain of biopharma has produced the following list of candidate unigram 121A, with their corresponding correctness scores 148A: "prescribed"—19628, "ingredient"—15540, "dose" 15042, "prostate"—10541, "syringe"—8681, "antibiotics"—8284, "anxiety"—8477, "kidneys"—8046, and the like.

In another example, experimental results of candidate unigram 121A evaluation in the subject domain of reselling tickets (e.g., tickets for sporting events, theatre, opera, etc.) has yielded the following list of candidate unigram 121A, with their corresponding correctness scores 148A: "performances"—5439, "yankees"—4471, "cubs"—3803, "angels"—3803, "stadium"—3803, "reds"—3481, "rodeo"—3269, "dodgers"—2574, "braves"—2511, "concerts"—2412, "playoff"—2182, "nationals"—1869, and the like.

Unigram extraction module 140 may select or identify the top scoring candidate unigrams 121A (e.g., having the highest correctness score 148A). These unigrams are referred to herein as identified unigrams 140A. Identified unigrams 140A (like identified unigrams 130A) may then be further analyzed to enhance language model 160A, as elaborated herein.

Reference is now made back to FIG. 4. According to some embodiments, and as elaborated herein (e.g., in relation to FIG. 3 and/or FIG. 4), system 100 may include an n-gram expansion module 150. N-gram expansion module 150 may be configured to analyze speech data elements 20 in view of identified unigrams 130A and/or 140A, to extract from speech data elements 20 at least one n-gram 150A. The at least one n-gram 150A may include one or more identified unigrams 130A/140A.

As elaborated herein, greedy decoder 120 may compute, for one or more (e.g., each) produced unigram, a unigram metadata 120A' element that represents a confidence level or confidence score.

According to some embodiments, n-gram expansion module 150 may analyze the occurrences of unigrams 120A in the greedy decoder transcription. For one or more identified candidate unigrams 130A/140A, n-gram expansion module 150 may locate in the speech data element 20, an n-gram of adjacent unigrams, that includes the candidate unigram 130A/140A.

According to some embodiments, for one or more candidate unigrams 130A/140A, n-gram expansion module 150 may locate in the speech data element 20 an n-gram of adjacent unigrams, that includes the candidate unigram 130A/140A. In other words, n-gram expansion module 150 may search through the transcriptions of greedy encoder 120, of speech data element 20 (which are sequences of greedy-decoded unigrams 120A), to find identified unigrams 130A and/or 140A in the sequences of decoded unigrams 120A.

N-gram expansion module 150 may use the identified unigrams 130A and/or 140A as "anchor" unigrams in an expansion search algorithm, as elaborated herein. The term "anchor" may be used in this context to indicate an identified unigram (e.g., 130A and/or 140A) that may mark a beginning of the expansion search process.

N-gram expansion module 150 may be configured to find sequences of unigrams 120A (e.g., words) that include the identified unigrams 130A and/or 140A, in speech data elements 20. These sequences of unigrams 120A are referred to herein as extracted n-grams 150A. N-gram expansion module 150 may subsequently update language model 160A to include the extracted at least one n-gram 150A.

According to some embodiments, and as indicated by its name, N-gram expansion module 150 may perform a process of expansion search in the sequences of unigrams 120A obtained by greedy encoder 120, starting from an anchor unigram 130/140. The term "expansion" may be used herein to indicate that an n-gram may be composed by expanding a sequence of unigrams 120A in at least one direction from anchor unigram 130/140, until a stop condition is met.

For example, starting from an anchor identified unigram 130A/140A in a sequences of unigrams 120A obtained from greedy decoder 120, the expansion search may proceed to a next unigram (e.g., word) in both directions (e.g., to a previous unigram in the sequences of unigrams 120A and to a subsequent word in the sequences of unigrams 120A).

If (a) the next unigram 120A has a confidence value metadata 120A' that is above a predefined threshold, and (b) the next unigram 120A is also included in the group of identified unigrams 130A/140A and/or included in language model 160A, then the next unigram 120A is added or merged into the expanding n-gram 150A. If the next unigram 120A does not fulfil conditions (a) and (b) above, then the stop condition is met in the relevant direction, and the expansion search process is halted in that direction. If the stop condition is met in both directions, then the expansion search process is terminated for the relevant anchor identified unigram 130A/140A, and the expansion of n-gram 150A is halted. N-gram expansion module 150 may then proceed to the next anchor identified unigram 130A/140A in the sequence of greedy decoded transcribed unigrams 120A.

It may be appreciated that the expansion search process as elaborated above may guarantee that every unigram or word in n-gram 150A may have a greater confidence level 120A' than the predefined threshold and is therefore likely to be correctly spelled. This acts as an additional filter which increases the probability of the n-gram 150A to be correct.

Therefore, and according to some embodiments, if (a) the unigrams 120A of the expanding n-gram 150A correspond to a confidence level 120A' that exceeds a predefined threshold value, and (b) the expanding n-gram 150A includes at least (e.g., more than) a predefined threshold number of unigrams, then language model builder 160 may update language model 160A to include the extracted at least one n-gram 150A. If otherwise, then the candidate unigram 130A/140A may be filtered out of the corpus of candidate unigrams, and may not be introduced to language model 160A According to some embodiments, N-gram expansion module 150 may limit the length of n-grams 150A to a maximal value or length of words. For example, N-gram expansion module 150 may limit the length of n-grams 150A to 6 words in each direction in relation to the anchor unigram, resulting in a maximal n-gram length of 13 words (including the anchor unigram).

Additionally, or alternatively, n-gram expansion module 150 may limit the length of n-grams 150A to a minimal value, e.g., to a length of 3 word. Such limitation may guarantee that n-grams 150A may maintain contextual relations among member unigrams in the n-gram.

According to some embodiments, N-gram expansion module 150 may limit the amount of verbatim-identical n-grams. This contributes whole n-grams to the language-model containing the extracted out-of-vocabulary unigrams.

According to some embodiments, in addition to the method of extraction of n-grams 150A "as-are" from the greedy-decoded sequence of unigrams 120A, N-gram expansion module 150 may recover more n-grams by correcting likely-misspelled unigram anchor occurrences 130A/140A.

For example, N-gram expansion module 150 may collaborate with misspell filter(s) 146 of FIG. 7, and utilize a similarity table such as table 2, to prepare a list of unigrams 151A. The list of unigrams 151A may include unigrams that have been erroneously misspelled, resulting in unigram anchors 130A/140A.

Unigrams 151A may, for example, include unigrams that are similar to at least one anchor unigram 130A/140A, in a sense that their mutual embedding similarity score 142B (e.g., word2vec similarity score) is above a predefined threshold (e.g., 0.7), and their mutual Levenshtein distance value 133A is below a predefined threshold (e.g., 2). For one or more (e.g., each) anchor unigram occurrences 130A/140A, n-gram expansion module 150 may maintain a mapping 151B to the original, correctly spelled unigram 151A. Once the n-gram 150A is extracted, n-gram expansion module 150 may substitute the anchor unigram occurrence 130A/140A with the correctly spelled unigram version 151A, using mapping 151B. In the event that a likely misspelled anchor unigram 130A/140A corresponds to a plurality of correctly spelled unigram version 151A, n-gram expansion module 150 may select the one corresponding to the highest mutual embedding similarity score 142B. For example, "ankees" is a likely misspell of "yankees" as they have an embedding similarity score 142B (e.g., word2vec similarity score) of 0.853 and a Levenshtein distance value of 1.

It should be noted that there may be cases of anchor unigram 130/140 split, that may result in erroneous n-gram 150A extraction, if not corrected appropriately. For example, a unigram such as "troubleshoot" may be split to "trouble" and "shoot". Although "trouble" may serve as a legitimate (e.g., correctly spelled) unigram anchor on its own, that may be seen in other contexts (e.g., not necessarily followed by "shoot"), it could still be a wrong anchor.

According to some embodiments, in order to correct such cases of split unigrams, n-gram expansion module 150 may post-process the extracted n-grams 151A. In this post-processing, n-gram expansion module 150 may fuse one or more (e.g., each) bigrams 151C (e.g., consecutive unigrams) in n-gram 150A, and analyze each fused bigram 151C separately. For example, a bigram may include the consecutive unigrams "rec" and "tangle". The subsequent fused bigram 151C may be "rectangle". If the fused bigram 151C forms an existing (e.g., already included in language model 160A), legitimate (e.g., correctly spelled) unigram, then the n-gram 150A may be changed to contain the fused bigram 151C in place of the pair of pre-fused unigrams.

It should be noted that there may be cases in which fusion of a bigram (e.g., two consecutive unigrams) may form a misspelled unigram anchor. In such conditions, n-gram expansion module 150 may collaborate with misspell filter(s) 146 of FIG. 7, and add a step to the bigram fusion process, to checks whether the fused bigram 151C forms a misspelled anchor 130A/140A. According to some embodiments, this is where adding collocation underscores as elaborated herein (e.g., in relation to preprocessing module 141 of FIG. 7) may be utilized. The collocation underscores may be identified, and inserted into the similarity table (e.g., table 2). Misspells filter(s) 146 may then remove the underscore symbol and may insert the outcome as an optional unigram for substitution 151A.

For example, candidate unigrams 121A "reck" and "tangle" may be identified by preprocessing module 141 as a collocation, and may be fused to obtain a unified candidate unigram "reck_tangle" 121A. Misspell filter(s) 146 may insert candidate unigram "reck_tangle" 121A into a similarity table (e.g., table 2) with the similar unigram "rectangle" which may later be discovered as a unigram anchor 130A/140A, according to the following process: (a) Misspells filter(s) 146 may remove the underscore in "reck_tangle" to produce "recktangle"; (a) Misspells filter(s) 146 may map 151B "recktangle" as associated with a correctly spelled unigram 151A "rectangle"; (c) n-gram expansion module 150 may post-process an ngram containing "reck_tangle", and may fuse the two components to form a fused bigram 151C "recktangle"; (d) As "recktangle" is mapped 151B to the correctly spelled unigram form 151A "rectangle", n-gram expansion module 150 may substitute "recktangle" with "rectangle", resulting in a correctly spelled n-gram 150A.

According to some embodiments, n-gram expansion module 150 may add the newly extracted n-grams 150A to the existing in-house text corpus of audio transcriptions 20B. For example, in-house audio transcriptions 20B may include transcriptions of a call-center, dedicated for discussions regarding a specific subject domain (e.g., banking, health, sports, etc.) and may now be updated with the newly extracted n-grams 150A, that include newly-identified, correctly spelled words.

Additionally, n-gram expansion module 150 may add the newly extracted n-grams 150A to audio transcriptions 20B with some weighted value 20B' that may represent a predefined priority. For example, weight 20B' may signify a priority of date (e.g., latest discussions weighted more relevant than prior discussions). In another example, weight 20B' may signify a priority of subject (e.g., emergency issues weighted more relevant than non-emergency issues). Other weighted values 20B' may also be implemented.

According to some embodiments, n-gram expansion module 150 may collaborate with an n-gram language model builder model 160 (or "builder 160", for short). Builder 160 may receive the newly extracted n-grams 150A from n-gram expansion module 150, and may rebuild or recompile language model 160A to include the added, newly extracted n-grams 150A. System 100 may then proceed to employ beam decoder 170 with the new language model 160A, as elaborated herein (e.g., in relation to FIG. 2) to produce a transcription 100A of incoming speech data elements 20A.

According to some embodiments, system 100 may utilize the extracted n-grams 150A as supervisory data, to automatically retrain, or fine-tune the training of acoustic model 110, based on speech data elements 20. In other words, system 100 may automatically fine-tune neural network 110 using a training dataset that includes utterances of newly discovered words, to facilitate future recognition of these words in speech data elements 20.

According to some embodiments, greedy decoder 120 may produce, for each decoded unigram 120A a metadata element that is a timestamp of utterance of unigram 120A in speech data element 20. N-gram expansion module 150 may produce, for one or more extracted n-gram 150A at least one corresponding snippet timestamp 150B, based on the timestamp metadata 120A'. For example, snippet timestamp 150B may include a timestamp of a beginning of n-gram 150A (e.g., timestamp 120A' of the first unigram 120A in n-gram 150A) in speech data element 20. In another example, snippet timestamp 150B may include a timestamp of an ending of n-gram 150A (e.g., timestamp 120A' of the end of the last unigram 120A in n-gram 150A) in speech data element 20.

N-gram expansion module 150 may collaborate with artificial neural network (ANN) refinement module 180. ANN refinement module 180 may receive one or more extracted n-grams 150A and corresponding snippet timestamps 150B (e.g., start and end times), and may filter the extracted n-grams 150A to produce a group of n-grams 150A that are longer than a predefined time period (e.g., 2.5 seconds in length).

ANN refinement module 180 may include the extracted n-grams 150A (which are now transcriptions of snippets of audio speech data elements 20) in the in-house corpus of audio transcriptions 20B. ANN refinement module 180 may then retrain acoustic model 110 based on the snippet of audio speech data elements 20 (as defined by timestamps 150B), and using the added extracted n-grams 150A as supervisory data.

Additionally, ANN refinement module 180 may attribute a weight to the added extracted n-grams 150A, to heighten the retraining of acoustic model 110 based on this new supervisory data. ANN refinement module 180 may fine tune the training of acoustic model 110 with this mixed dataset for several epochs (e.g., 10). It has been experimentally shown that such training may considerably raise the recall of words in extracted n-grams 150A.

In addition, it has been experimentally shown that the overall word-error-rate gain is considerable as well when stopping at best-improvement on the target group set. It is still considerable when taking the last model (but less so). During testing, the word-error-rate of a subset of utterances (e.g., utterances that contain at least one of the unigram anchors) is lowered to almost the same value as the overall word-error-rate, while previously it was considerably higher. This suggests that out-of-vocabulary words are initially "harder" for the neural-network to be correctly recognized, but when introduced to the neural network they become "familiar" like the rest of the known vocabulary.

Figure 8:
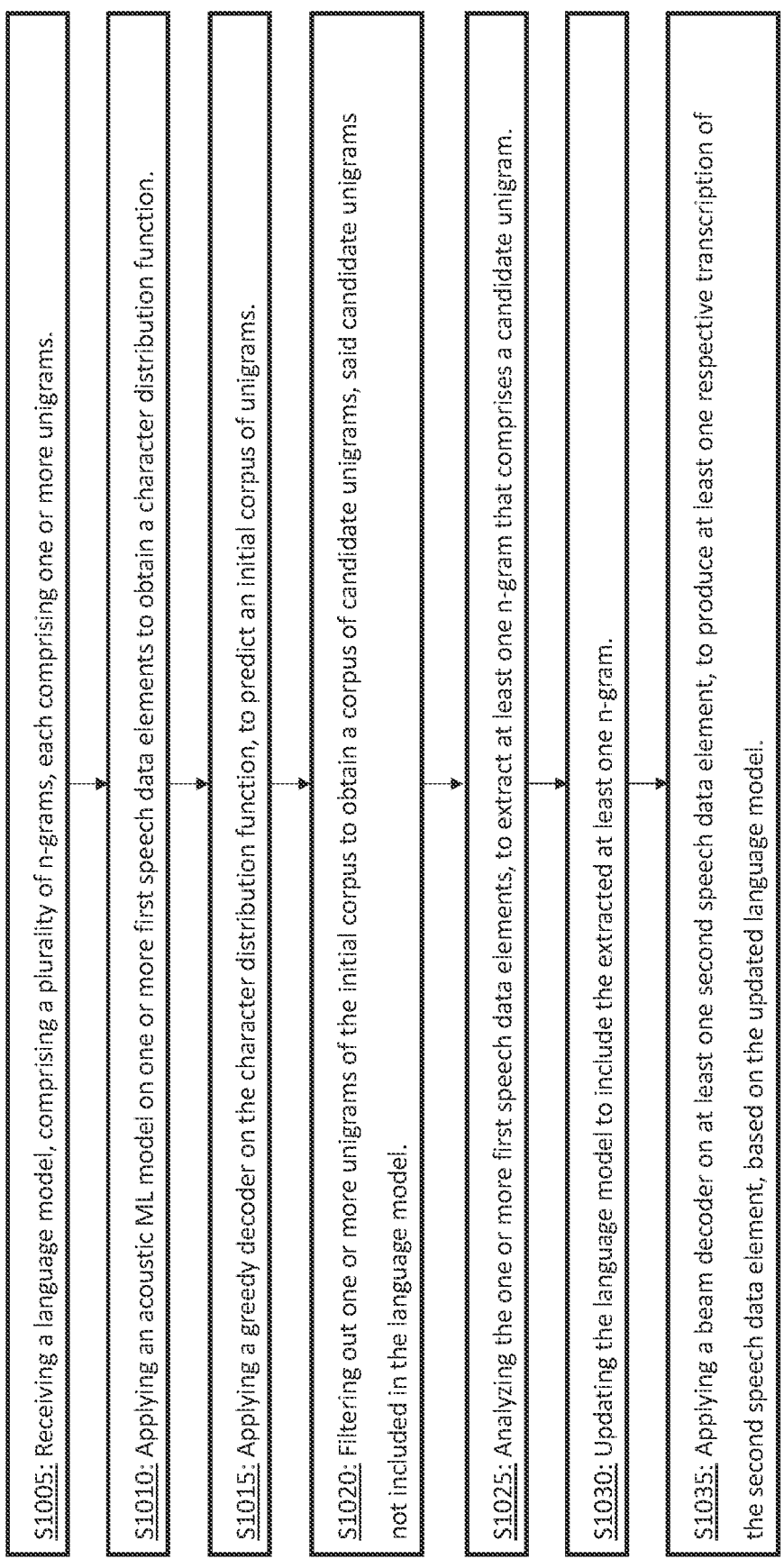
FIG. 8 is a flow diagram, depicting a method of automatically discovering unigrams in a speech data element by a system for speech recognition, according to some embodiments of the invention.

Reference is now made to FIG. 8, which is a flow diagram, depicting a method of automatically discovering unigrams in a speech data element by at least one processor of a system for speech recognition, according to some embodiments of the invention.

As shown in step S1005, the at least one processor (e.g., element 2 of FIG. 1) may receive a language model 160A, that may include a plurality of n-grams. Each such n-gram may include one or more unigrams.

As shown in step S1010, the at least one processor 2 may apply an acoustic machine-learning model (e.g., acoustic model 110 of FIG. 2) on one or more first speech data elements (e.g., speech element 20 of FIG. 4), to obtain a character distribution function (e.g., character distribution element 110A of FIG. 2).

As shown in step S1015 and S1020, the at least one processor 2 may apply a greedy decoder (e.g., greedy decoder 120 of FIG. 4) on the character distribution function 110A to predict an initial corpus of unigrams (e.g., elements 120A of FIG. 3). The at least one processor 2 may filter out one or more unigrams of the initial corpus 120A to obtain a corpus of candidate unigrams (e.g., elements 121A, 130A, 140A of FIG. 3) that are not included in language model 160A.

As shown in step S1025, and as elaborated herein (e.g., in relation to FIGS. 3-7) the at least one processor 2 may analyze the one or more first speech data elements 20, to extract at least one n-gram (e.g., element 150A of FIG. 4) that includes a candidate unigram (e.g., 121A, 130A, 140A).

As shown in step S1030 and 1035, the at least one processor 2 may update the language model 160A to include the extracted at least one n-gram 150A. The at least one processor 2 may subsequently (e.g., in an inference stage) apply a beam decoder (e.g., beam decoder 170 of FIG. 2) on at least one second speech data element 20, to produce at least one corresponding transcription of the second speech data element 20, based on the updated language model 160A.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of automatically discovering unigrams in a speech data element, by at least one processor, the method comprising:
   receiving a language model, comprising a plurality of n-grams, each comprising one or more unigrams;
   applying an acoustic machine-learning (ML) model on one or more first speech data elements to obtain a character distribution function;
   applying a greedy decoder on the character distribution function, to predict an initial corpus of unigrams;
   filtering out one or more unigrams of the initial corpus to obtain a corpus of candidate unigrams, said candidate unigrams not included in the language model;
   analyzing the one or more first speech data elements, to extract at least one n-gram that comprises a candidate unigram; and
   updating the language model to include the extracted at least one n-gram.

2. The method of claim 1, further comprising applying a beam decoder on a second speech data element, to produce at least one transcription of the second speech data element, based on the updated language model.

3. The method of claim 1, wherein the character distribution function represents a likelihood of appearance of one or more language characters in the one or more first speech data elements.

4. The method of claim 1, further comprising retraining the acoustic ML model, based on the at least one second speech data element, using the extracted at least one n-gram as supervisory data.

5. The method of claim 1, wherein filtering out one or more unigrams further comprises:
   for one or more candidate unigrams, calculating a misspell probability, representing a likelihood that a relevant unigram is a misspelled version of a unigram that is already included in the language model; and
   filtering out candidate unigrams that correspond to a misspell probability that exceeds a predefined threshold.

6. The method of claim 5, wherein calculating a misspell probability comprises:
   calculating a Levenshtein distance value between the candidate unigram and at least one second unigram, already included in the language model;
   calculating a frequency score, representing a ratio of appearance between the candidate unigram and the at least one second unigram in the one or more first speech data elements; and
   calculating the misspell probability based on the Levenshtein distance value and the frequency score.

7. The method of claim 6, wherein the greedy decoder is adapted to emit, for each unigram of the initial corpus, a respective confidence level, and wherein calculating a misspell probability further comprises:
   calculating a confidence score, representing an average of the confidence level for one or more appearances of the candidate unigram in the one or more first speech data elements; and
   calculating the misspell probability further based on the confidence score.

8. The method of claim 7, wherein the language model further comprises definition of one or more language syntactic rules, and wherein calculating the Levenshtein distance value comprises:
   calculating a number of single-character edits between the candidate unigram and the second unigram; and
   calculating the Levenshtein distance value based on the one or more language syntactic rules and the number of single-character edits.

9. The method of claim 5, further comprising:
   for one or more candidate unigrams, calculating a missing space probability, representing a likelihood that the candidate unigram is a concatenation of two unigrams that are already included in the language model;
   filtering out candidate unigrams that correspond to a missing space probability that exceeds a predefined threshold.

10. The method of claim 7, further comprising:
    calculating, for at least one first candidate unigram, a first unigram embedding vector, based on the corpus of candidate unigrams;
    calculating, for at least one second candidate unigram, a second unigram embedding vector, based on the corpus of candidate unigrams;
    calculating a similarity score based on the first unigram embedding vector and the second unigram embedding vector, and
    computing the misspell probability further based on the similarity score.

11. The method of claim 10, further comprising receiving a document corpus, comprising a plurality of documents, wherein each document is associated with a specific subject domain, and wherein each document comprises a plurality of document unigrams.

12. The method of claim 11, further comprising:
    for one or more candidate unigrams, calculating an in-domain score based on the plurality of document unigrams, wherein said in-domain score represents a likelihood that the candidate unigram is pertinent to at least one specific domain.

13. The method of claim 12, further comprising, for one or more candidate unigrams:
    compiling a context list, comprising a subset of document unigrams that (a) have an in-domain score that exceeds a predefined threshold and (b) appear in the one or more first speech data elements;
    for each document, obtaining an intersection group comprising unigrams that appear in the document and in the context list;
    for each document, calculating a correctness score representing relevance of the candidate unigram to the document, based on the in-domain scores of document unigrams in the intersection group; and
    filtering out candidate unigrams that correspond to a maximal correctness score that is below a predefined threshold.

14. The method of claim 1, wherein the greedy decoder is adapted to emit, for each unigram of the initial corpus, a respective confidence level, and wherein analyzing a speech data element of the one or more first speech data elements, comprises:

for one or more candidate unigrams, locating in the speech data element, an n-gram of adjacent unigrams, comprising the candidate unigram;

if (a) the unigrams of said n-gram correspond to a confidence level beyond a predefined value, and (b) said n-gram comprises more than a predefined threshold number of unigrams then the language model is updated to include the extracted at least one n-gram; and if otherwise, then the candidate unigram is filtered out of the corpus of candidate unigrams.

15. A system for automatically discovering unigrams in a speech data element, the system comprising: a non-transitory memory device, wherein modules of instruction code are stored, and at least one processor associated with the memory device, and configured to execute the modules of instruction code, whereupon execution of said modules of instruction code, the at least one processor is configured to:

receiving a language model, comprising a plurality of n-grams, each comprising one or more unigrams;

applying an acoustic ML model on one or more first speech data elements to obtain a character distribution function;

applying a greedy decoder on the character distribution function, to predict an initial corpus of unigrams;

filtering out one or more unigrams of the initial corpus to obtain a corpus of candidate unigrams, said candidate unigrams not included in the language model;

analyzing the one or more first speech data elements, to extract at least one n-gram that comprises a candidate unigram; and updating the language model to include the extracted at least one n-gram.

16. The system of claim 15, further comprising a beam decoder, configured to receive at least one second speech data element, and produce a transcription of the at least one second speech data element, based on the updated language model.

17. The system of claim 15, wherein the at least one processor is configured to filter out one or more unigrams by:

for one or more candidate unigrams, calculating a misspell probability, representing a likelihood that a relevant unigram is a misspelled version of a unigram that is already included in the language model; and filtering out candidate unigrams that correspond to a misspell probability that exceeds a predefined threshold.

* * * * *